United States Patent [19]

Sheppard

[11] 4,279,679

[45] Jul. 21, 1981

[54] METHOD OF MANUFACTURING INSULATING CORRUGATED STRUCTURAL MEMBERS

[75] Inventor: Elvin N. Sheppard, Barton-under-Needwood, England

[73] Assignee: Pierdeed Limited, Staffordshire, England

[21] Appl. No.: 47,316

[22] Filed: Jun. 11, 1979

[30] Foreign Application Priority Data

Jun. 21, 1978 [GB] United Kingdom ............... 27505/78

[51] Int. Cl.3 ........................... B32B 3/02; B32B 3/28

[52] U.S. Cl. .................................... 156/196; 156/210; 156/308.2; 264/500; 264/571; 264/220; 264/225; 264/287; 264/337; 428/174; 428/177; 428/192; 428/920

[58] Field of Search ............... 428/184, 183, 192, 920, 428/921; 156/196, 210, 308.2; 264/287, 294, 220, 225, 505, 500, 571, DIG.53, 337

[56] References Cited

U.S. PATENT DOCUMENTS

| | | | |
|---|---|---|---|
| 1,399,455 | 12/1921 | Armstrong | 428/184 |
| 2,840,500 | 6/1958 | Okoomian et al. | 428/184 |
| 3,540,079 | 11/1970 | Bush | 264/505 |
| 3,566,447 | 5/1971 | Ogden | 264/337 |
| 3,738,830 | 6/1973 | Kimura et al. | 264/220 |

FOREIGN PATENT DOCUMENTS

| | | |
|---|---|---|
| 894196 | 4/1962 | United Kingdom . |
| 1034881 | 7/1966 | United Kingdom . |
| 1042936 | 9/1966 | United Kingdom . |
| 1366481 | 9/1974 | United Kingdom . |
| 1455008 | 11/1976 | United Kingdom . |

*Primary Examiner*—Paul J. Thibodeau

*Attorney, Agent, or Firm*—Holman & Stern

[57] ABSTRACT

An insulating corrugated member is provided by two sheets having identical corrugations, at least one of the sheets being of a thermoplastic material and having its edges deformed, the deformed edges being adhesively secured to the other sheet. The edges of the thermoplastic sheet are deformed on a mold which is prepared by using, as a template, a sheet having identical corrugations by the application of heat and differential gas pressure to opposite sides of the thermoplastic sheet.

10 Claims, 3 Drawing Figures

METHOD OF MANUFACTURING CORRUGATED STRUCTURAL INSULATING MEMBERS

BACKGROUND OF THE INVENTION

Field of the Invention

This invention relates to insulating corrugated structural members, and to methods for their manufacture.

It is known to use corrugated sheets as roof or wall members on buildings. It may be required to provide insulation on buildings so constructed, and it has hitherto been the practice to provide a separate insulating layer which is secured to, or spaced from, the aforesaid corrugated sheet.

It is an object of the present invention to provide corrugated structional members which do not require the attachment of a separate insulating layer during construction of a building.

It is a further object of the invention to provide an insulating corrugated structural member which is transparent or translucent, and may thus be used as a building light.

SUMMARY OF THE INVENTION

According to the invention an insulating corrugated structural member comprises first and second sheets which have substantially identical corrugations, one of said sheets being of a thermoplastic material and having its edges turned up so as to engage the other of said sheets and to maintain said sheets in spaced substantially parallel relationship, the edges of said one sheet being secured to said other sheet.

According to another aspect of the invention a method of manufacturing an insulating corrugated structural member as above defined includes the steps of using as a template a sheet having corrugations substantially identical to those of said first and second sheets, said template being used to prepare a mould for said one sheet, heating the edges of said one sheet and forming said heated edges on said mould by application of a differential gas pressure to opposite sides of said one sheet.

BRIEF DESCRIPTION OF THE DRAWINGS

Embodiments of the invention will now be described by way of example only.

In the drawings.

DESCRIPTION OF THE PREFERRED EMBODIMENTS

In the example the panel is intended as a roof light, and comprises a sheet 10 of transparent corrugated thermoplastic material, and a plurality of sheets 11, also of transparent thermoplastic material, and having corrugations identical with those of the sheet 10. The widths of the sheets 11 are substantially equal to that of the sheet 10, as shown in FIG. 1, and the lengths of the sheets 11 are such that a plurality of the sheets 11 may be spaced lengthwise of the sheet 10, as shown in FIGS. 2 and 3.

Figure 1:
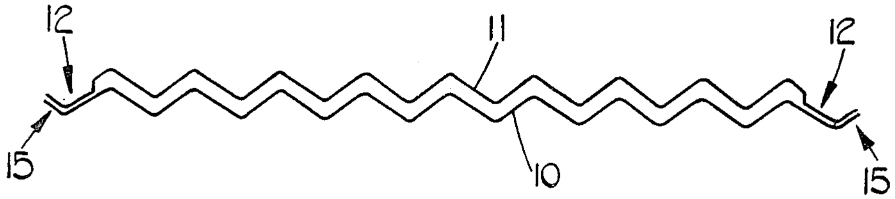
FIG. 1 is a section, in the direction of arrow 1 in FIG. 2, through an insulating corrugated panel.
Figure 2:
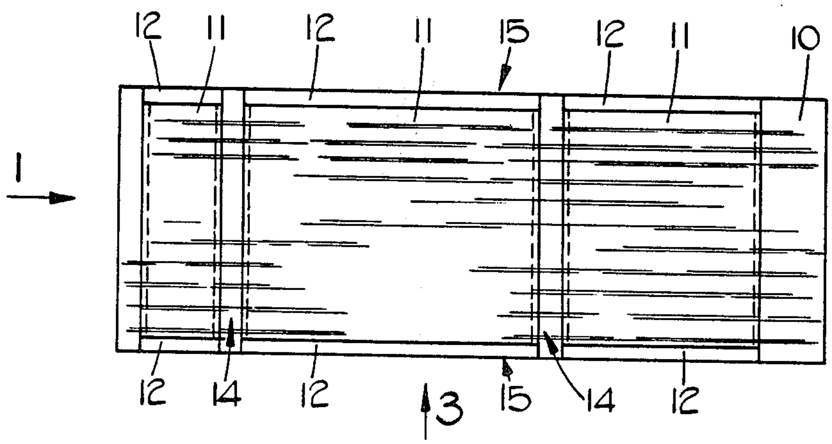
FIG. 2, is a plan view, to a smaller scale, of the panel of FIG. 1.
Figure 3:
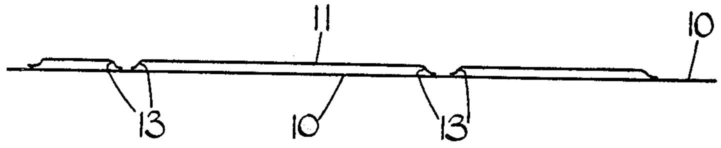
FIG. 3 is a view on arrow 3 in FIG. 2.

The edges of the sheets 11 are deformed as shown by the opposed lateral outer portions at 12 in FIG. 1 and by the ends at 13 in FIG. 3 so that when the corrugations of the sheets 10, 11 are aligned, as shown in FIG. 1, the deformed edges of the sheets 11 have outwardly-turned portions which engage the sheet 10 and maintain the sheets 10, 11 in spaced parallel relationship. The edges of the sheets 11 are adhesively secured to the sheet 10. The outwardly-turned portions of the edges of the sheets 11 thus lie close to adjacent portions of the sheet 10 and, by extending up to the lateral edges of the sheet 10 which are parallel to the corrugations, provide reinforced edges 15 for the panel as a whole. As shown in FIG. 1 the portions adjacent the lateral outer edges of the sheets 11 are deformed over distances which are greater than the distance from those edges to the apex of the nearest corrugation. Adhesion may be effected by application of a suitable adhesive material or by thermal bonding. If desired the sheets 10, 11 may be secured together so as to hermetically seal the space between them. Alternatively openings may be provided to permit drainage or drying of any condensate in the space between the sheets.

The panels may conveniently be made from commercially available corrugated sheet, and the sheet 10 is, in effect, such a commercially-available sheet.

The edges of the corrugated sheets 11 are subsequently deformed by known processes of vacuum moulding or blow moulding, the sheet edges being previously heated to a temperature at which they may readily be deformed. A forming mould may conveniently be made from glass fibre reinforced plastics material, the corrugations in the mould being provided by using as a template sections of a basic sheet having the same corrugations as sheets 10, 11. Moulds of any desired size may readily be provided, up to the maximum available size of the sheet 10, the sheets 11 being cut to size before their edges are deformed.

The lengths of the sheets 11 are determined, in the present example, by the desired locations of the spaces 14 between them, these spaces 14 being provided to accommodate the purlins of a roof to which the panel is applied. It will thus be apparent that, in use, the sheet 10 is uppermost on the panel, which can therefore shed water freely.

In use the side edges 15 of the panel may be arranged so as to overlap adjoining panels, these adjoining panels being either standard corrugated sheets or insulating panels according to the present invention. In the latter case the sheet 11 may be formed so that the insulating space between the sheets extends close to one side edge 15 of the sheet 10, whereby the insulating effect will be substantially continuous over the roof surface. Alternatively, panels as shown in FIG. 1 may be assembled alternatively with panels in which the insulating space extends close to both edges 15 of the sheet 10.

In an alternative embodiment the panels may be formed of opaque sheets, in which case the space between the sheets may be filled with a suitable insulating material as for example rock wool or glass wool.

In a further alternative embodiment the sheet 10 is of a material other than thermoplastics, for example resin-bonded glass fibre.

It will be apparent that the panels may be made from sheet which is corrugated in ways other than the generally sinusoidal form shown in FIG. 1. Such sheets are well known and are readily commercially available. The above described use of a basic sheet as a template to produce the required edge-forming mould enables any readily available sheet to be used for the described insulating panels.

I claim:

1. A method of manufacturing an insulating structural member from two sheets which have previously been provided with substantially identical longitudinally extending corrugations from one lateral edge to the other lateral edge over their full width, at least one of said sheets being of a thermoplastic material, said method comprising deforming said one sheet only, so that the lateral outer edge portions thereof are displaced from the plane of the remainder of said one sheet, and securing said lateral outer edge portions to the other sheet so that the corrugations on said sheets are maintained in substantially parallel spaced relationship from edge to edge.

2. A method as claimed in claim 1 in which said lateral outer edge portions are formed with corrugations which correspond to those of said sheets.

3. A method as claimed in claim 1 which includes using as a template a sheet having corrugation corrugation which are substantially identical with those of said two sheets, said template being used to prepare a mould, locating said one sheet on said mould and deforming said lateral outer edge portions of said one sheet on said mould.

4. A method as claimed in claim 3 in which said mould is prepared from fiber-reinforced plastic material.

5. A method as claimed in claim 1 in which said lateral outer edge portions of said one sheet are deformed by application of heat and a differential gas pressure to opposite sides of said one sheet.

6. A method as claimed in claim 1 in which the lateral outer edge portions of said one sheet which lie parallel to the corrugations thereon, extend outwardly to the lateral edges of the corresponding portions of said other sheet.

7. A method as claimed in claim 1 in which said other said sheet is of a thermoplastic material.

8. A method as claimed in claim 7 in which both of said sheets are of a light-transmitting material.

9. A method as claimed in claim 1 in which a solid insulating material is provided in the space between said sheets.

10. A method as claimed in claim 1, wherein said lateral outer edge portions of said one sheet are deformed over a distance from each lateral outer edge greater than the distance from each lateral outer edge to the apex of the nearest corrugation.

* * * * *